March 3, 1942. C. E. JENKS 2,274,700

SCREENING APPARATUS

Filed Feb. 14, 1939

INVENTOR:
CLIFTON E. JENKS
BY Horace B. Fay
ATTORNEYS.

Patented Mar. 3, 1942

2,274,700

UNITED STATES PATENT OFFICE 2,274,700

SCREENING APPARATUS

Clifton E. Jenks, Willoughby, Ohio, assignor to The W. S. Tyler Company, Cleveland, Ohio, a corporation of Ohio Application February 14, 1939, Serial No. 256,289

1 Claim. (Class 209—401)

This invention relates, as indicated, to screening apparatus for wet or dry bulk materials and the like, but has reference more particularly to apparatus of this character in which the screens are electrically or otherwise vibrated or oscillated.

Where fine screens are used in apparatus of the aforesaid character, such screens being relatively light in weight have been difficult to vibrate in a satisfactory manner and it has therefore been proposed to employ as a backing for such fine screen a heavier and more coarsely woven screen, both screens being then vibrated or oscillated. Due to the difference in weight of the screens however, the period of vibration of the screens differ to some extent with the result that the screens rub against each other, entailing rapid wear and requiring frequent replacements.

Moreover, where such fine screens are employed in screening wet materials, a film of water adheres to the screen which interferes to some extent with the screening operations.

It is a primary object of the present invention, accordingly, to provide means for preventing the abrasion and wear of screens used in the foregoing manner, and to utilize for this purpose a material which will not itself be too rapidly abraded by the screens themselves or by the material to be screened.

Another object of the invention is to provide means for this purpose which will not materially affect the screening action or inefficiency of the screens.

A further object of the invention is to provide means which will aid in preventing the formation of or in breaking up films of water on the screens which interfere with the screening operations.

To the accomplishment of the foregoing and related ends, said invention, then, consists of the means hereinafter fully described and particularly pointed out in the claim; the annexed drawing and the following description setting forth in detail certain mechanism embodying the invention, such disclosed means constituting, however, but one of various means in which the principle of the invention may be used.

In said annexed drawing—

Figure 1:
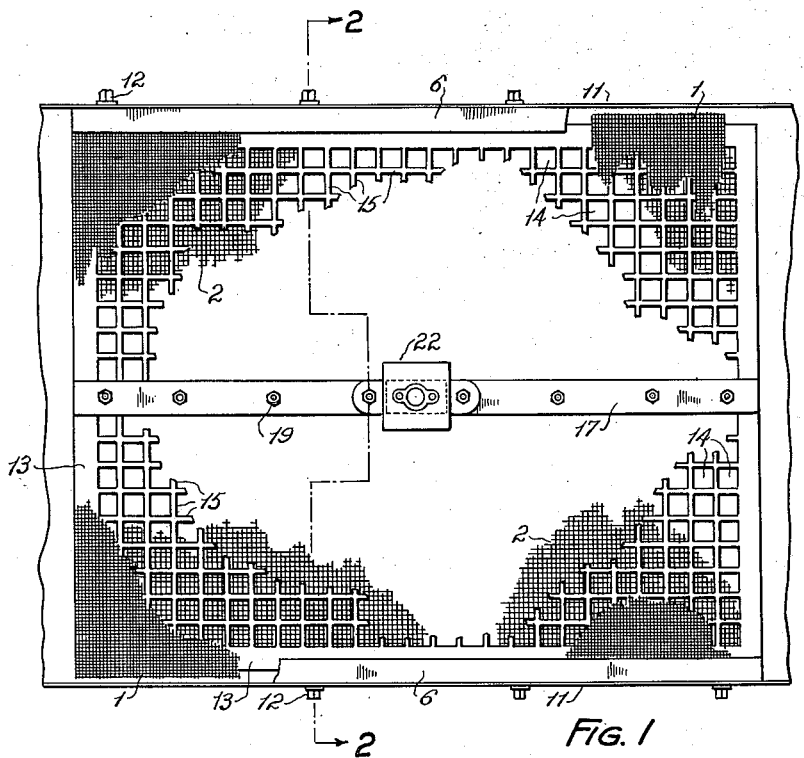
Fig. 1 is a plan view of screening apparatus embodying the novel features of the invention.
Figure 2:
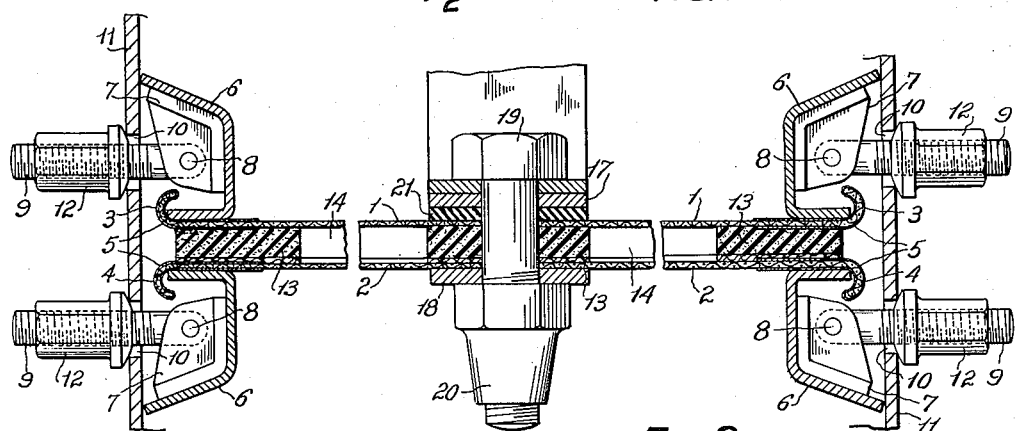
Fig. 2 is a broken cross-sectional view on an enlarged scale taken on the line 2—2 of Fig. 1.
Figure 3:
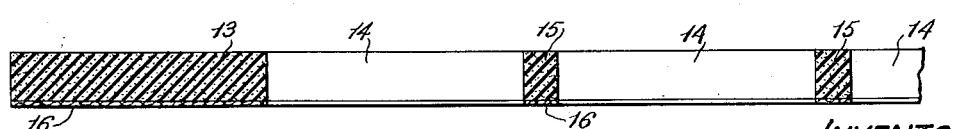
Fig. 3 is a fragmentary cross-sectional view through the sponge rubber pad.

Referring more particularly to the drawing, it will be seen that the apparatus comprises a pair of spaced screens 1 and 2, the upper or facing screen 1 being a relatively fine screen and the lower or backing screen 2 being coarser or heavier than the upper screen.

The screen 1 is curled at its marginal edges to provide upwardly directed curved flanges 3 and the screen 2 is curled at its marginal edges to provide downwardly directed curved flanges 4. The flanges 3 and 4 are bound with tape 5 formed of strips of sheet metal.

The screens are maintained at a fixed drumhead tension for vibratory purposes by means of members 6 of hook-like cross-section which engage the inner surfaces of the flanges 3 and 4, or rather engage the taping 5 which binds these flanges. Each of these members is provided with a plurality of spaced clips or brackets 7 and to each of these brackets is pivotally secured, as at 8, a bolt 9 which extends through an opening 10 in the supporting frame 11 of the apparatus. Each bolt is provided with a nut 12 which engages the outer surface of the frame 11 and by manipulation of which the tension of the screens 1 and 2 may be adjusted within desired limits.

For the purpose of preventing these screens from rubbing against each other and thereby becoming abraded during vibration thereof, a pad 13 of sponge rubber or the like is interposed between the screens 1 and 2, filling the space therebetween. This pad is substantially coextensive in its external dimensions with the screens themselves and is provided with a multiplicity of uniformly spaced square openings 14, which openings are defined by and separated from each other by relatively thin ribs 15. In actual practice, the pad will be about ⅜ of an inch in thickness, the openings 14 approximately 2″ squares and the ribs approximately ¼ of an inch in width. In any event the openings are so large in relation to the size of the openings in the screens that the pad 13 in no way interferes with the passage of the material being screened through the screens. At the same time the ribs are sufficiently stiff to effectively space the screens at all points where they contact the screens.

The pad, being formed of a soft sponge rubber will act to cushion the screens in a desired manner during the vibration thereof, and, if desired, the pad may be backed by a layer 16 of cloth or other fabric vulcanized thereto for reinforcement purposes, and to prevent the rubber from stretching.

The screens and pads are secured to each other along the centers thereof as by means of metal strips 17 and 18, bolts 19 which extend through the strips, screens and pad, and nuts 20 engaging the strips. A strip of rubber 21 is preferably interposed between the strip 17 and the screen 1.

In actual practice, the pad is under some compression between the screens, and this compression is sufficient to cause the individual wires of which the screens are composed to slightly embed themselves in the soft surfaces of the pad. In this way, the entrance of the materials being screened into spaces or crevices between the screen wires and the pad is precluded, and this source of abrasion of the screens and pad eliminated.

The pad, moreover, is effective to prevent the formation of, as well as to break up, films of water on the upper screen, and in this way, the screening efficiency of the apparatus is materially increased.

Instead of sponge rubber, other soft, resilient, abrasion-resistant materials may be employed, such, for example, as felt, asbestos, etc. Moreover, the openings in the pad may be of other shapes, such as rectangular, polygonal, circular, etc.

The screens are adapted to be simultaneously vibrated by electro-magnetic vibrating mechanism, which is generally indicated by the reference numeral 22 in Fig. 1, such vibrating mechanism being operatively connected to the strips 17 as in the manner disclosed in Reynolds Patent 1,597,826.

Other modes of applying the principle of my invention may be employefd instead of the one explained, change being made as regards the mechanism herein disclosed, provided the means stated by the following claim or the equivalent of such stated means be employed.

I therefore particularly point out and distinctly claim as my invention:

Screening apparatus comprising spaced metallic screens and a soft rubber spacing pad therebetween, said pad being substantially coextensive in its external dimensions with said screens and having openings therein considerably larger than the screen openings, said pad having substantially flat surfaces in engagement with said screens, the pad being under compression by said screens, said compression being such that the individual wires of which said screens are composed are partially embedded in the surfaces of said pad, and means securing said screens and pad together along the centers of the screens and pad.

CLIFTON E. JENKS.